United States Patent
Lehane et al.

(10) Patent No.: US 11,098,474 B2
(45) Date of Patent: Aug. 24, 2021

(54) WALL CHANNEL FOR GRID TEE

(71) Applicant: USG Interiors, LLC, Chicago, IL (US)

(72) Inventors: James J. Lehane, Olmsted Falls, OH (US); John M. Willi, Westlake, OH (US)

(73) Assignee: USG INIERIORS, LLC, Chicago, IL (US)

( * ) Notice: Subject to any disclaimer, the term of this patent is extended or adjusted under 35 U.S.C. 154(b) by 0 days.

(21) Appl. No.: 16/297,918

(22) Filed: Mar. 11, 2019

(65) Prior Publication Data
US 2020/0291634 A1    Sep. 17, 2020

(51) Int. Cl.
| E04B 1/24 | (2006.01) |
| E04B 2/72 | (2006.01) |
| F16B 7/04 | (2006.01) |
| E04B 9/30 | (2006.01) |
| E04B 9/12 | (2006.01) |

(52) U.S. Cl.
CPC ............... *E04B 1/24* (2013.01); *E04B 2/723* (2013.01); *E04B 9/127* (2013.01); *E04B 9/30* (2013.01); *F16B 7/0486* (2013.01)

(58) Field of Classification Search
CPC . E04B 9/127; E04B 9/30; E04B 9/068; E04B 9/067; E04B 1/24; E04B 2/723; F16B 7/0486
USPC ............... 52/506.07, 220.6, 506.06, 506.1
See application file for complete search history.

(56) References Cited

U.S. PATENT DOCUMENTS

| 1,803,589 | A | * | 5/1931 | Bohnsack | E04B 2/825 52/241 |
| 3,798,865 | A | * | 3/1974 | Curtis | E04B 9/127 52/665 |
| 3,989,399 | A | * | 11/1976 | Slowbe | E04B 9/127 403/245 |
| 4,074,812 | A | * | 2/1978 | Skubic | A47B 57/50 211/182 |
| 4,586,841 | A | * | 5/1986 | Hunter | E04B 9/127 403/230 |

(Continued)

FOREIGN PATENT DOCUMENTS

| WO | 2017-041810 A1 | 3/2017 |
| WO | 2017-210071 A1 | 12/2017 |

OTHER PUBLICATIONS

Notification of Transmittal of the International Search Report and the Written Opinion of the International Searching Authority, or the Declaration, PCT/US2020/019586, dated Jun. 26, 2020.

*Primary Examiner* — Brian D Mattei
*Assistant Examiner* — Matthew J Gitlin
(74) *Attorney, Agent, or Firm* — Pearne & Gordon LLP

(57) ABSTRACT

An elongated sheet metal channel for transversely supporting drywall grid tees at regular intervals along the channel, the channel having a generally vertical web, and a lower flange and an upper flange, a vertical spacing between the flanges being sufficient to receive upright grid tees at the intervals, the lower flange having outer and mid-width portions lying in a generally horizontal plane at an interval when a tee is received therein, opposed formations stamped into one of the flanges at the intervals to longitudinally locate the grid tee, the upper flange at said intervals having a pocket for receiving a distorted end of a grid tee.

5 Claims, 3 Drawing Sheets

(56) References Cited

U.S. PATENT DOCUMENTS

| | | | | |
|---|---|---|---|---|
| 4,610,562 A * | 9/1986 | Dunn | E04B 9/18 | |
| | | | 403/191 | |
| 4,854,096 A * | 8/1989 | Smolik | E04B 2/767 | |
| | | | 52/241 | |
| 5,325,651 A * | 7/1994 | Meyer | E04B 2/766 | |
| | | | 52/243 | |
| 5,394,665 A * | 3/1995 | Johnson | E04B 2/766 | |
| | | | 52/105 | |
| 5,755,066 A * | 5/1998 | Becker | E04B 2/7411 | |
| | | | 52/241 | |
| 5,937,605 A * | 8/1999 | Wendt | E04B 9/127 | |
| | | | 403/119 | |
| 6,374,558 B1 * | 4/2002 | Surowiecki | E04B 2/7457 | |
| | | | 52/241 | |
| 7,223,043 B1 * | 5/2007 | Andrews | E04B 2/766 | |
| | | | 403/363 | |
| 7,240,460 B2 | 7/2007 | Platt | | |
| 7,779,593 B2 | 8/2010 | Jahn et al. | | |
| 7,832,171 B2 * | 11/2010 | Erickson | E04B 2/767 | |
| | | | 52/653.1 | |
| 7,975,448 B2 | 7/2011 | Jahn et al. | | |
| 8,074,416 B2 * | 12/2011 | Andrews | E04B 2/767 | |
| | | | 403/230 | |
| 8,863,477 B2 * | 10/2014 | Stal | E04B 1/24 | |
| | | | 264/279 | |
| 9,127,456 B2 * | 9/2015 | Dollerup | E04B 2/7457 | |
| 9,386,855 B2 * | 7/2016 | Sabounjian | A47B 96/14 | |
| 10,151,110 B2 * | 12/2018 | Czyzewicz | E04B 9/067 | |
| 10,364,566 B1 * | 7/2019 | LeBlang | | |
| 2006/0010812 A1 * | 1/2006 | Jones | E04B 9/068 | |
| | | | 52/506.07 | |
| 2007/0056245 A1 * | 3/2007 | Edmondson | E04B 1/24 | |
| | | | 52/848 | |
| 2008/0236068 A1 * | 10/2008 | Jahn | E04B 9/068 | |
| | | | 52/220.6 | |
| 2013/0031856 A1 * | 2/2013 | Pilz | E04B 2/7457 | |
| | | | 52/232 | |
| 2015/0090683 A1 * | 4/2015 | Sabounjian | A47B 96/14 | |
| | | | 211/186 | |

\* cited by examiner

WALL CHANNEL FOR GRID TEE

BACKGROUND OF THE INVENTION

The invention relates to suspended drywall ceiling construction and, in particular, to a wall channel for receiving grid tee ends.

PRIOR ART

Wall channel and wall angle for suspended drywall ceilings are commercially available. Some versions of these products are disclosed in U.S. Pat. Nos. 7,240,460, 7,779, 593, and 7,975,448. The latter products typically have locating elements for automatically spacing grid tees on a regular center-to-center spacing along the length of the channel or angle. Prior wall angle and channel products have limited capacity to accurately position and restrain a grid tee, especially under highly variable forces involved during positioning and screwing of drywall sheets to the undersigned of the grid tees.

SUMMARY OF THE INVENTION

The invention provides a wall channel for drywall grid that accurately spaces grid tees and positively retains their ends in place while sustaining drywall placement and screwing forces developed during installation of a suspended ceiling.

The disclosed elongated single piece channel incorporates several inventive aspects that improve performance and uniformity of an assembled structure. Ideally, the channel in its manufactured or free state has a pair of flanges parallel to each other and extending perpendicularly to a web joining the flanges. At regular intervals or centers along the channel are formations that constrain a grid tee end when a grid tee is assembled on the channel in transverse relation. At least one, and preferably both, of the flanges have relief areas at an inner margin adjacent the web to receive a local distortion on the snipped end of a grid tee and thereby allow the tee to be more easily set in position on center at the formations.

In a preferred form of the channel, the flanges each embrace a length of the end of a grid member with essentially parallel surfaces so that the grid end is fully seated and supported by the channel to receive screws through a flange and the grid tee. The abutment of parallel surfaces reduces the risk of deflection of a screw and/or surface separation in a screwing step.

DESCRIPTION OF THE PREFERRED EMBODIMENT

Figure 3:
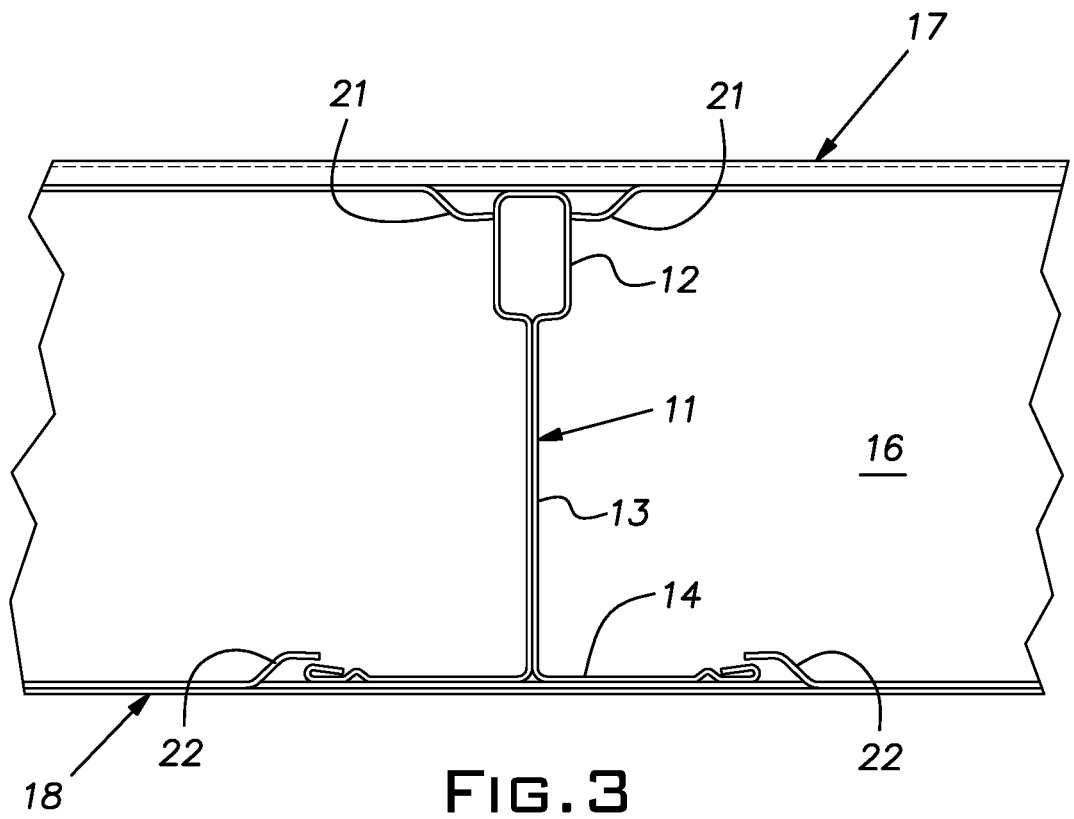
FIG. 3 is a fragmentary cross-sectional view taken through a grid tee installed on the inventive channel.

A channel 10 embodying the invention is shown in the various figures. The channel 10 is preferably a unitary sheet metal product made from a single strip of metal, for example, hot-dipped galvanized 0.018 to 0.021 inch (0.46 to 0.53 mm) thick steel. The channel 10, having a generally C-shaped cross-section, can be roll-formed or formed in a press brake. The channel 10 can have a length of, for example, 12 feet (3600 mm) and be proportioned to receive the end of a grid tee 11 with a nominal height of, for example, 1⅝ inch (41 mm). The illustrated grid tee 11 has a conventional construction and configuration known in the art. FIG. 3 illustrates that the grid tee 11 includes an upper hollow reinforcing bulb 12, a double layer web 13, and a flange 14. As is conventional, the grid tee 11 is roll-formed of a single strip of steel. Typically, the flange has a nominal width of 1½ inches (38 mm) and the bulb has a nominal width of ¼ inch (6.3 mm).

Figure 4:
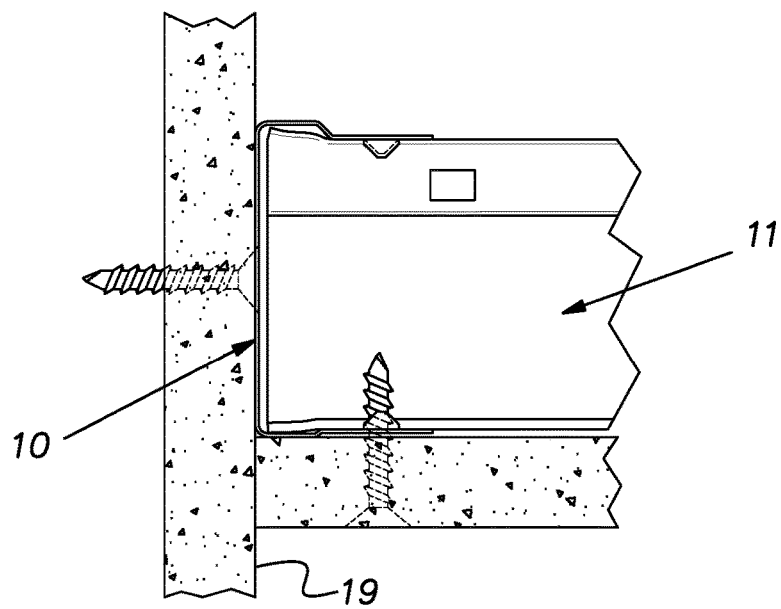
FIG. 4 is a view similar to FIG. 2 showing the attachment of the wall channel to a drywall panel representing a vertical wall and a drywall panel secured to the underside of the channel and grid tee end.

The channel 10 has a vertical web 16 supporting generally perpendicular upper and lower flanges 17, 18, respectively. In use, the web 16 is ordinarily oriented in a vertical plane against a wall 19 represented by a drywall sheet in FIG. 4. Where desired, the upper surface of the flange 17 and lower surface of the flange 18 can be knurled or otherwise roughened to stabilize a screw tip being driven into the same as is known in the art.

Figure 1:
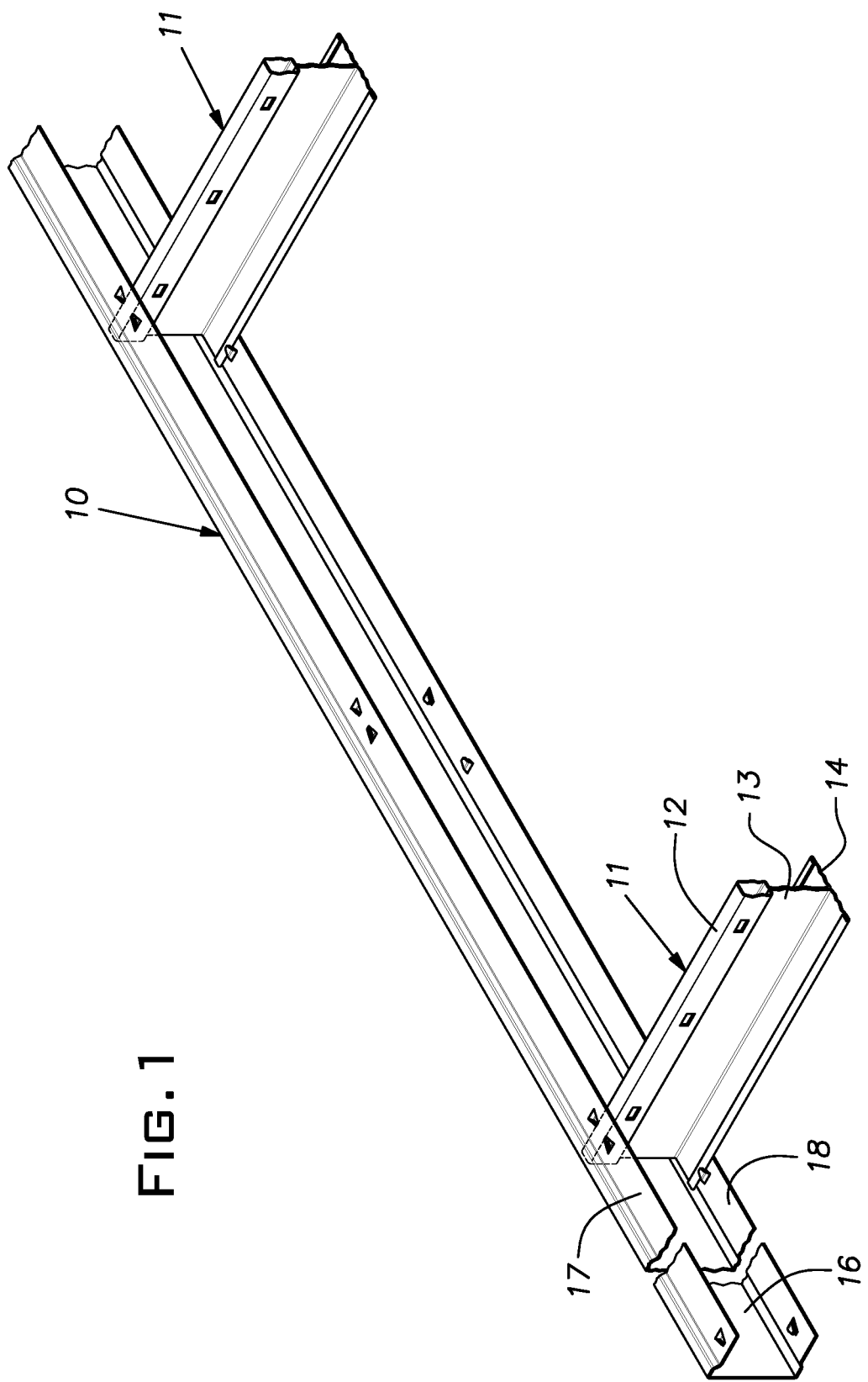
FIG. 1 is a somewhat diagrammatic fragmentary perspective view of grid tee members assembled with a wall channel embodying the invention.
Figure 2:
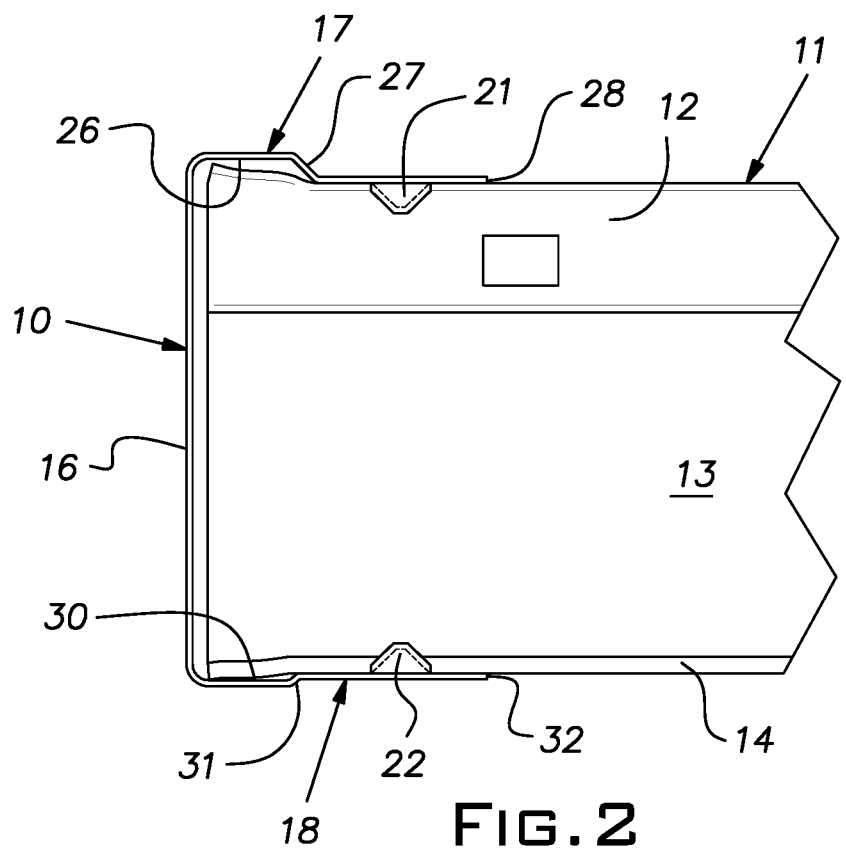
FIG. 2 is a cross-sectional view of the wall channel and an end of a grid tee received in the channel.
Figure 5:
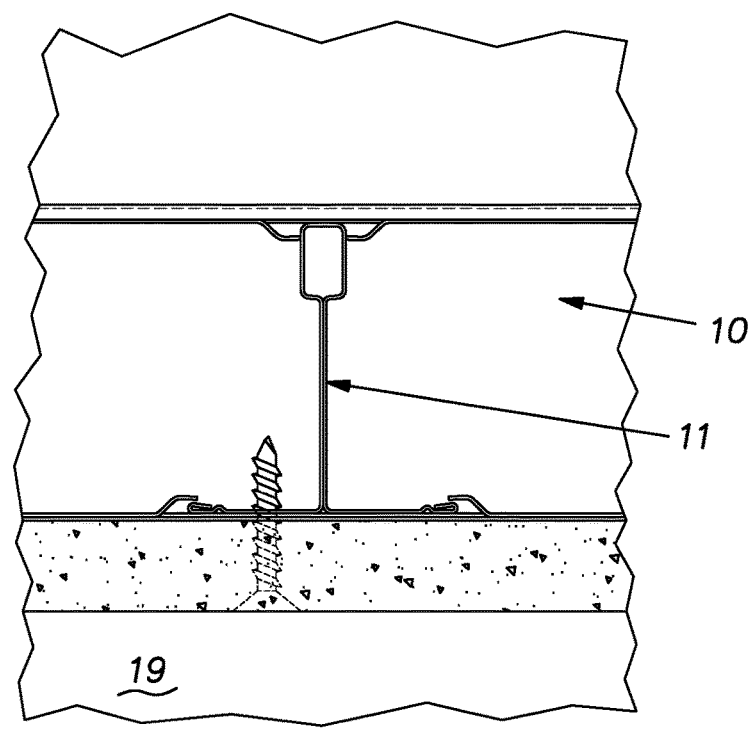
FIG. 5 is a view similar to FIG. 3 showing a drywall panel screw attached to a grid tee received in the inventive channel.

The flanges 17, 18 are lanced to provide inwardly projecting formations 21, 22 which abut or stop against a grid tee 11 so as to locate and longitudinally fix an end of a grid tee. Adjacent pairs of projections 21 in the upper flange 17 are spaced a distance apart equal to or slightly greater than the width of a reinforcing bulb 12. Adjacent pairs of projections 22 on the lower flange 18 are proportioned to straddle and thereby fix a flange 14 of an end of the grid tee 11 received in the channel 10. With particular reference to FIGS. 3 and 5, the projections 21, 22 are symmetrically disposed on opposite sides of an imaginary central plane perpendicular to the channel 10 and coinciding with a central plane of an assembled grid tee 11. The pairs of the projections 21, 22 thus form a center or location or interval at which a grid tee is received. The projection defined centers are regularly spaced along the full length of the channel 10 and, for example, can be arranged such that the centers are regularly spaced at 8 inches (200 mm) apart from one another. As shown in FIG. 1, a center coincides with the factory produced end of the channel 10, it being understood that an opposite end of the channel 10 formed at the factory will also coincide with a center of the formations 21, 22. As shown in FIG. 1, at a factory end only one projection or stop 21, 22 exists in the upper and lower flanges 17, 18, respectively. The stops or projections 21, 22 precisely locate grid tees automatically along the channel 10 so that, for example, by choosing to skip one or two projection centers, the grid tees 11 can be on 16 inch (400 mm) or 24 inch (800 mm) centers. As shown in the FIGS., the web 16 is devoid of elements that laterally restrain the grid tee 11 at an interval.

The inside spacing between the flanges 17, 18 is about equal to the nominal height of a grid tee. By way of example, but not limitation, the flange spacing can be 0.010 inch (ten thousandths of an inch) (0.25 mm) less than the nominal height of a grid tee which, by way of example, is 1⅝ inch (41 mm). Being spaced slightly less than the nominal height of a grid tee, the flanges 17, 18 can provide a slight frictional fit of the tees 11 in the channel 10.

In accordance with certain aspects of the invention, the flanges 17, 18 have provision for accommodating end distortion of a grid tee 11 when the grid tee is field cut to length by an installer using a conventional pair of tin snips. Typically, during its shear action, the tin snips crush the reinforcing bulb 12 causing the bulb to permanently buckle upwardly and locally increasing the height of the grid tee 11. The flange 14 of the grid tee is likewise subjected to permanent distortion, when snipped to length with tin snips, typically adding to a local increase in the effective height or vertical extent of the grid tee 11.

The upper flange 17 has a vertical clearance offset or pocket 26 increasing the internal space beginning at a transition point or zone 27, where the slope of the flange 17 changes somewhat abruptly, and extending away from a free edge 28 of the flange 17 towards the web 13. Similarly, the lower flange 18 has a vertical clearance offset or pocket 30, also locally increasing the space between the flanges, beginning at a transition point or zone 31 where the slope of the flange changes abruptly and extending away from a free edge 32 of the flange towards the web 13. By way of example, but not limitation, the offset 26 of the upper flange 17 can be about 0.08 inch (2 mm) and the offset 30 of the lower flange 18 can be about 0.02 inch (0.5 mm), although these offsets need not be constant across their respective widths.

In the illustrated embodiment of the channel 10, the offsets 26, 30 extend continuously along the length of the channel and with the transition zones 27, 31, serve to stiffen the channel 10. It can be envisioned, however, that the offsets or pockets 26, 30 can be locally formed at the center planes of the projections 21, 22. In such a case, the distortion receiving pockets stamped or otherwise formed in the channel flanges 17, 18 will be localized so as to receive grid tee ends at the centers defined by the stops 21, 22.

The offsets 26, 30 thus serve as distortion receiving pockets at the grid tee receiving centers represented by the projections 21, 22. Ideally, the vertical distance between the flanges 17, 18 adjacent either of the transition zones 27, 31 is about equal or slightly less than the nominal height of the grid tee and outer margins of the flanges 17, 18 outward of the transition zones 27, 31 are substantially parallel. Where, as shown, the widths of the flanges 17, 18 measured from the web 16 to their free edges 28, 32 is nominally 1 inch (25.4 mm), the widths of the offsets 26, 30 are at least ⅛ inch (3.2 mm) and can be about ⅓ inch (8 mm). These offset widths can accommodate a relatively large variation in the actual cut length of a grid tee 11 which may occur as the grid tees are manually cut and installed along the length of the channel 10.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. An elongated sheet metal channel for transversely supporting drywall grid tees at intervals along the channel, the channel having a generally vertical web, a lower flange and an upper flange, the web and flanges being made from a single strip of metal, the lower and upper flanges being connected respectively to lower and upper margins of the web, a vertical spacing between the flanges being adapted to receive upright grid tees at the intervals, the lower flange having outer and mid-width portions lying in a generally horizontal plane at an interval when a tee is received therein, opposed formations stamped into one of the flanges and projecting into a zone between the flanges at the intervals with a spacing along a length of a channel proportioned to straddle a width of the grid tee to longitudinally locate the grid tee along the channel, the upper flange at said intervals having a first pocket for receiving a distorted end of a grid tee resulting from the grid tee being cut with tin snips, said flanges having outer portions in a free state that are generally perpendicular to said web, the first pocket being adjacent the web and separated from the outer portion of the upper flange by a transition zone at which a slope of the upper flange changes, and providing a spacing from the lower flange greater than the free state spacing between the outer portions of the flanges, the lower flange at said intervals having a second pocket adjacent the web providing a spacing from the upper flange greater than the free state spacing between the outer portions of the flanges.

2. A channel as set forth in claim 1, wherein said first pocket has a horizontal width of at least ⅛ a distance of a free edge of the upper flange from the vertical web.

3. A channel as set forth in claim 1, wherein said web is generally flat.

4. A channel as set forth in claim 1, wherein said pockets of said upper and lower flanges are continuous along the length of the channel.

5. A channel as set forth in claim 1, wherein said flanges have substantially the same width.

\* \* \* \* \*

UNITED STATES PATENT AND TRADEMARK OFFICE
CERTIFICATE OF CORRECTION

| | | |
|---|---|---|
| PATENT NO. | : 11,098,474 B2 | Page 1 of 1 |
| APPLICATION NO. | : 16/297918 | |
| DATED | : August 24, 2021 | |
| INVENTOR(S) | : James J. Lehane et al. | |

It is certified that error appears in the above-identified patent and that said Letters Patent is hereby corrected as shown below:

On the Title Page

Column 1, Item (73) Assignee: should read --USG INTERIORS, LLC, Chicago, IL (US)--.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*